US00RE43053E

(19) United States
(12) Reissued Patent
Dawe et al.

(10) Patent Number: US RE43,053 E
(45) Date of Reissued Patent: Jan. 3, 2012

(54) ICE MAKER AND A METHOD OF MAKING ICE

(75) Inventors: Steve Dawe, Concord (CA); Michael Horodenka, Mississauga (CA); Alex Makarenko, Bradford (CA)

(73) Assignee: Ice Research, Inc., Markham, Ontario (CA)

(21) Appl. No.: 11/843,316

(22) Filed: Aug. 22, 2007

Related U.S. Patent Documents

Reissue of:
(64) Patent No.: 6,931,874
Issued: Aug. 23, 2005
Appl. No.: 10/185,968
Filed: Jun. 27, 2002

(30) Foreign Application Priority Data

Jun. 29, 2001 (CA) ..... 2351946
May 1, 2002 (CA) ..... 2384457

(51) Int. Cl.

| | |
|---|---|
| ***A63C 19/10*** | (2006.01) |
| ***F25C 1/24*** | (2006.01) |
| ***F25C 1/00*** | (2006.01) |
| ***F25C 5/08*** | (2006.01) |
| ***F25C 1/14*** | (2006.01) |
| ***F25D 23/12*** | (2006.01) |
| ***A01G 27/00*** | (2006.01) |
| ***A01G 25/09*** | (2006.01) |
| ***B67D 7/56*** | (2010.01) |
| ***B05B 1/24*** | (2006.01) |
| ***B05B 1/20*** | (2006.01) |

(52) U.S. Cl. ..... 62/235; 62/74; 62/260; 62/347; 62/351; 62/354; 239/69; 239/74; 239/135; 239/146; 239/166; 239/172; 239/548; 239/550

(58) Field of Classification Search ..... 62/235, 62/347, 351, 354, 260, 74; 239/69, 74, 135, 239/146, 172, 166, 548, 550, 566
See application file for complete search history.

(56) References Cited

U.S. PATENT DOCUMENTS 3,591,236 A * 7/1971 Jones ..... 299/24
(Continued)

FOREIGN PATENT DOCUMENTS

JP 10-246544 A * 9/1998

OTHER PUBLICATIONS

Abstrac of JP 10-246544 A to Kakinuma Mitsuru.*

(Continued)

*Primary Examiner* — Mohammad M Ali
(74) *Attorney, Agent, or Firm* — Vidas, Arrett & Steinkraus

(57) ABSTRACT

An ice maker for creating a layer of ice on a cooled surface, is disclosed. The ice maker has a source of de-gassed water, which may be de-gassed by being heated. A pump to pressurize the de-gassed water is provided and the water is passed to a sprayer hydraulically connected to the pump. The sprayer has nozzles sized and shaped to convert the pressurized water into a fine de-gassing droplet spray directed at the cooled surface. The droplets are sized to substantially freeze on contact with the cooled surface. In one embodiment a microprocessor is provided to change the volume sprayed according to the speed of the ice maker to ensure an even coat of ice is layed down.

35 Claims, 4 Drawing Sheets

U.S. PATENT DOCUMENTS 3,908,390 A * 9/1975 Dickson et al. ..... 62/73
4,142,678 A * 3/1979 Bottum ..... 237/2 B
4,394,817 A * 7/1983 Remillard ..... 62/235
4,551,985 A * 11/1985 Kovach ..... 62/235
4,572,785 A * 2/1986 Braaten ..... 210/181
4,767,239 A * 8/1988 Erwin ..... 405/217
4,903,505 A * 2/1990 Sakai et al. ..... 62/347
4,914,923 A * 4/1990 Duplan et al. ..... 62/71
4,944,103 A * 7/1990 Rzechula ..... 37/219
5,133,139 A * 7/1992 Rzechula ..... 37/219
5,536,411 A * 7/1996 Blades ..... 210/638
5,644,928 A * 7/1997 Uda et al. ..... 62/402
5,653,114 A * 8/1997 Newman et al. ..... 62/74
5,771,698 A * 6/1998 Abel ..... 62/66
5,836,513 A * 11/1998 Smith et al. ..... 239/2.2
5,931,003 A * 8/1999 Newman et al. ..... 62/74
5,955,887 A * 9/1999 Codner et al. ..... 324/689
5,959,198 A * 9/1999 Pollok et al. ..... 73/79
6,138,387 A * 10/2000 Fox et al. ..... 37/219
6,166,657 A * 12/2000 Mann ..... 340/905

OTHER PUBLICATIONS

Machine trtanslation of JP 10-246544 A to Kakinuma Mitsuru.*

* cited by examiner

ICE MAKER AND A METHOD OF MAKING ICE

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue of U.S. Pat. No. 6,931,874, which issued Aug. 23, 2005, the entire contents of which are hereby incorporated by reference.*

FIELD OF THE INVENTION

This invention relates generally to the field of ice making equipment and methods and more particularly to the type of ice making equipment and methods used for forming a layer of ice on a cooled surface such as may be found in indoor arenas having hockey and ice-skating rinks.

BACKGROUND OF THE INVENTION

The technology used to create and resurface ice on, for example indoor skating rinks, has been relatively unchanged for many years. Skating rink surfaces are typically formed on concrete or sand floors, in which are embedded pipes carrying a chilled brine solution. The brine temperature may be as low as 10° which is well below the 32° F. freezing temperature of water. The chilled hoar is then flooded with water, which freezes onto the chilled floor to farm an ice-surface. Typically, an indoor skating rink will have a layer of ice of about 1½ inches thick in total. The ice is built up to this thickness by repeatedly flooding the surface with layers of water. The layers freeze one onto the next to form an integral ice layer.

The ice may also be painted at one or more of the intermediate layers. For example, to provide good visual contrasts the entire ice surface may be painted white. To prevent the white paint from being marred by skaters, more ice is layered over the white paint, thereby protecting it. Then, additional graphics can be painted on the ice at higher levels. For example, for hockey, the red and blue lines, goal creases, and the like can be painted on, which will then contrast well with the white layer beneath. Further, more recently corporate logos have also now been painted on.

Typically, in the past, the initial ice surface was made by dragging a large hose onto the chilled floor and gradually manually flooding it with hot water. Hot water is preferred because it freezes to a more dense and harder ice surface which improves durability and playability. However, hot water flooding is more labour intensive. Several labourers are required to keep the hose in constant motion, to prevent it from melting through the already formed ice and forming ridges or damaging for example, any paint. Therefore, while this manual flooding process generally produces a secure and strong ice surface, it is also labour intensive, unsafe, and expensive.

As a result of the difficulties in using hot water floods, operators often use cold water floods instead. This is less expensive, since the cold water is less likely to melt through any ice already formed and the flooding need not be as carefully done. Cold water floods however produce ice that is less dense, has more voids and is thus softer. This means bigger chips and ruts are created by skates and results in more snow building up during skating. Excessive Snow is undesirable for hockey because it interferes with the free movement of the puck along the ice. Further, cold water floods result in ice which is typically cloudy, which obscures the painted lines and corporate logos. Lastly, the voids have an insulating effect. This is problematic because the cooling is provided at the bottom face of the ice surface whereas the skating activity takes place at the top of the ice surface. Drawing the heat away through a more insulating layer of ice is more energy expensive, and makes it more difficult to keep the surface cold and hard.

In addition to initial ice formation, typically ice surfaces upon which skating occurs have to be periodically resurfaced to eliminate the grooves and ruts made by skate blades. A standard technique is to use a resurfacing machine, one example of which is a resurfacer such as a "Zamboni". Such resurfacing machines are typically self-propelled and include a scrapper blade to pick up snow and ice chips. The scrapper blade is followed by a rag or a cloth that is dragged over the ice surface. A flood pipe is connected to a reservoir of water. As the cloth is dragged over the ice surface, the water is spread by the cloth onto the ice surface. Thus, a film of water is distributed over the ice surface in the path of the cloth. As the water freezes, over a period of time, a new top coat of ice is formed.

Unfortunately, the water layer freezes rather slowly taking some time to turn into ice. The length of time that it takes the thin layer of water to freeze into an ice sheet means that often there are wet spots or the like on the ice surface for the portion of the ice most recently passed over by the resurfacer when the players wish to recommence playing hockey. Surface water also interferes with the free movement of the puck along the ice. Further it is believed that as the water slowly cools to form ice, gasses are absorbed into the water, which then creates more voids or freezing. Thus, there is a tendency for voids to form in the ice as it freezes which leads to a weak bond softer and cloudy ice surface even though hot water was used initially. The problem is worse if cold water is used.

In summary, the traditional methods used to form and to resurface ice sheets results in an unacceptable quality of ice which is both soft and cloudy by reason of the voids. The voids weaken and otherwise detract from the playability of the ice sheets. This problem is particularly acute for indoor rinks with large spectator crowds such as hockey and figure skating events. The large crowds tend to result in warm air temperatures which hasten the deterioration of already weak ice. What is needed is some way to create and resurface an ice surface which reduces the heat load on the ice the formation of voids and thus create a harder, longer wearing and more durable ice surface that is more energy efficient.

SUMMARY OF THE INVENTION

The present invention provides an apparatus and method for forming an ice surface which substantially reduces the voids contained in the ice which forms. The voids are reduced by using degassed water to form the ice. By heating the water and then forcing the heated water through nozzles under pressure the water is effectively degassed. Then, the water droplets contact the cold surface and are effectively flash frozen. By flash freezing the small degassed water droplets a denser, harder ice surface is created.

Flash freezing is facilitated according to the present invention by forming a pressurized spray of very fine droplets of hot water in the order of 100 to 700 microns in diameter. This spray or mist is then directed onto an ice surface where the droplets, on contact, freeze quickly, almost instantaneously. No puddles, ponding or accumulation of liquid water occurs on the surface, which avoids the slow freezing problems of the prior art. The resulting ice is denser, clearer, smoother and demonstrates a stronger bond for improved skatability.

Therefore, according to one aspect of the present invention there is provided an ice maker for creating a layer of ice on a cooled surface, the ice maker comprising:

a source of de-gassed water;

a pump to pressurize the de-gassed water; and a sprayer hydraulically connected to the pump and having nozzles sized and shaped to convert said pressurized de-gassed water into a fine droplet spray directed at said cooled surface, wherein said droplets are sized to substantially freeze on contact with the cooled surface.

According to another aspect of the present invention there is provided a method of creating an ice surface comprising the steps of:

a) providing a source of water;

b) degassing said water;

c) creating a mist with said degassed water, said mist including droplets having a medium diameter of about between 100 and 700 microns; and d) directing said droplets onto a surface to be coated with ice.

According to another aspect of the present invention there is provided a kit for converting a water flooding ice resurfacer, said kit comprising:

a pressurizing pump;

one or more hoses for containing pressurized water connected to said pump; and a sprayer hydraulically connected to said pressure pump by said hoses, said sprayer including dripless nozzles sized and shaped to create a fine mist of water droplets directed at a surface to be coated, wherein said water flooding ice resurfacer can be converted to a mist applying ice resurfacer.

BRIEF DESCRIPTION OF THE DRAWINGS

The present invention will now be described, by way of example only, with reference to the attached drawings in which.

DETAILED DESCRIPTION OF THE PREFERRED EMBODIMENTS

Figure 1:
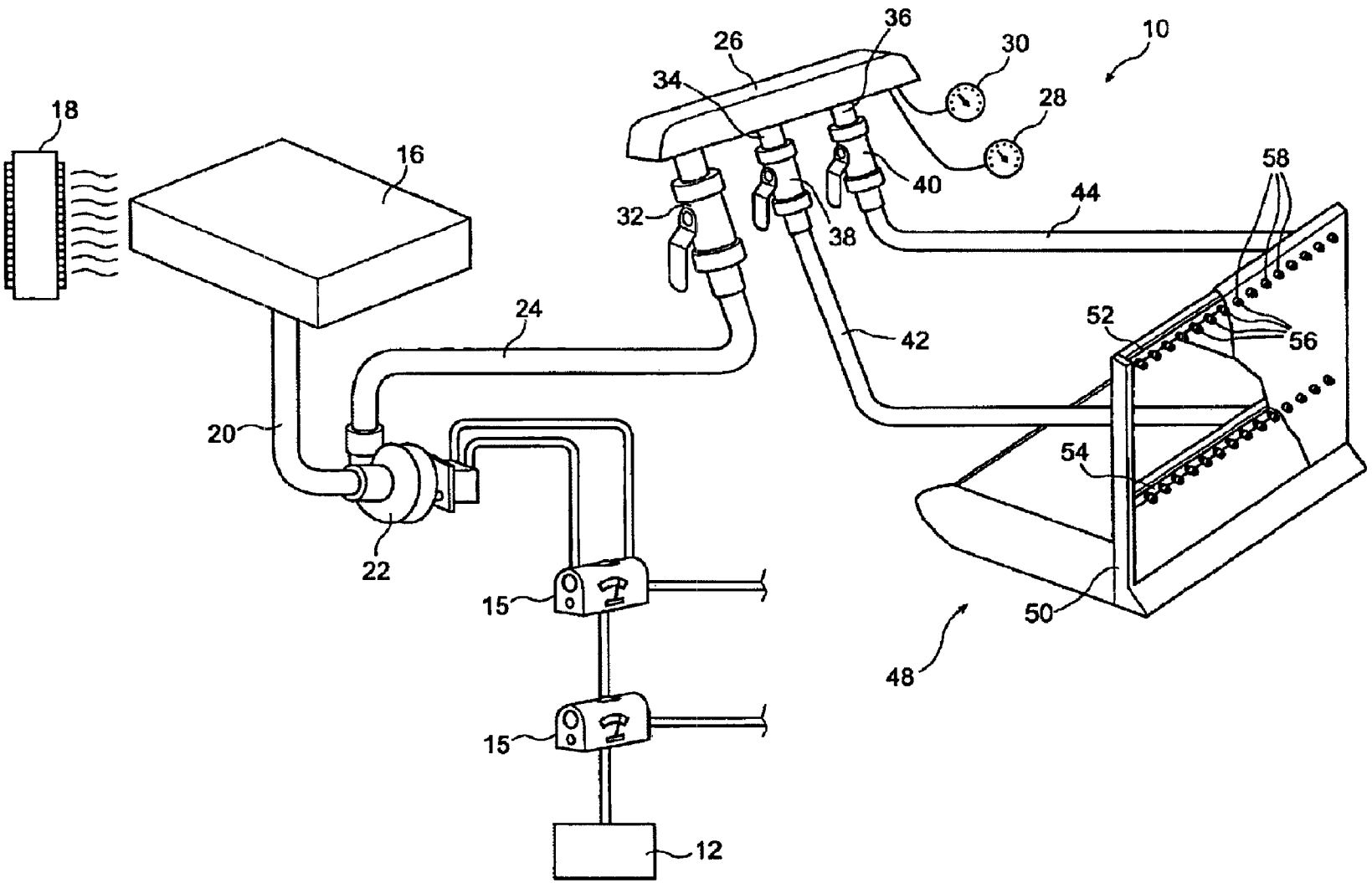
FIG. 1 is a schematic drawing of portions of a hydraulic system for an ice resurfacer and pressurized water lines according to the present invention.

An ice maker 10 according to the present invention is shown schematically in FIG. 1 FIG. 1 shows a hydraulic power system 12, powered, for example, by a hydraulic pump of a resurfacer. Because of the increased hydraulic load of the present invention on the conventional hydraulics of the resurfacer, it has been found that a higher capacity hydraulic pump is needed. Reasonable results have been obtained with a 20 gpm capacity pump, instead of the usual 10 gpm pump. One way to increase the pump capacity is to simply change the internal cam. As well, a flow diverter 15 is added to the hydraulic system, as explained in more detail below. There is a refillable water tank 16, which may be provided with a heater 18. Alternatively, the water tank 16 may be insulated, and filled with hot water to begin with.

It is preferred, according to the present invention, if the water in the refillable water tank is heated in order to ensure that it is as hot as possible. The preferred operating range of temperatures for the water is between 100° F. and 212° F. However, due to safety concerns, the most preferred range is between 140° F. to 160° F. Generally, the higher the temperature the less soluble are atmospheric gasses (primarily oxygen, but including nitrogen and $CO_2$) in the water. It will be appreciated that the temperature of the water can vary, and the best results can be achieved with the hottest water, which will have, by definition the lowest solubility for any such dissolved gasses. Lower temperatures can be used, but these will result in a higher solubility of dissolved gasses which will lead to less effective degassing and in turn to higher void levels in the ice. Cool or room temperature undegassed water has been found to be unacceptable. The present invention comprehends heating the water as an easy and inexpensive way to de-gas the same, but other methods of de-gassing such as applying a vacuum to the water prior to its application to form ice are also comprehended by the present invention. Thus, in this specification the term de-gassed water means water that has had the levels of dissolved gasses reduced to an extent sufficient to permit the formation of clear hard ice as hereinafter described.

Turning back to FIG. 1 there is shown a water conduit 20 connecting the water tank 16 to a centrifugal pump 22. The pump 22 as shown is powered by the hydraulic fluid from hydraulic power system 12, through flow diverter 15. It can be appreciated that pump 22 can also be powered by other means, such as electrically or by a drive belt. The centrifugal pump 22 increases the pressure in the water in pressure line 24. The most preferred pressure range is between 10 psi and 60 psi with good results having been achieved at about 30 psi. The pressure line 24 leads to a manifold 26 which preferably includes a number of sensors as well as a number of valves. For example, a pressure gauge 28 may be provided, as well as a temperature gauge 30. These sensors may be simple manually readable gauges or more preferably will be electronic sensors that will provide an output signal which corresponds to the quantity (i.e., temperature or pressure) being measured. An inlet valve 32 is shown connected by means of the manifold to outlet lines 34 and 36. Each outlet line may include a valve member 38, 40, which may be opened or closed. The valve members 38, 40 may be manually operated, as shown, or may be automated through the use of solenoids or the like. This is explained in more detail below.

Opening the main valve 32 permits the hot or degassed water to enter into the manifold 26. Opening either of the other two 38, 40 valves permits the water to then be carried by conduits 42, 44 to a sprayer 48. Preferably, the sprayer 48 takes the form of a frame 50 which may include two generally horizontal cross members 52 and 54. Each of the cross members 52, 54 is hollow, and includes a plurality of nozzle openings 56 along their length. The nozzle openings 56 are directed towards the cooled surface to be coated with ice. Nozzles 58 are attached to each of the nozzle openings 56.

Most preferably the conduits 42, 44 are connected to the hollow cross members towards a middle of each of the cross members. This is preferred because there will be a small pressure drop associated with each of the nozzles 58 in the conduits. To minimize the difference between the pressures at each of the nozzles it is preferred to centrally locate the connection to the hollow members. In general though the pressure drop is small between the nozzles and thus, while less preferred connecting the pressure line to the ends of the hollow members may also provide reasonable results. Maintaining the pressure consistent between nozzles is desirable because it is preferred to create an even coat of ice, meaning that the water being sprayed onto the surface should be applied evenly. Any local changes in pressure between nozzles can alter the rate of spraying through a given nozzle thus creating unevenness in application of the water which is undesirable.

Figure 2:
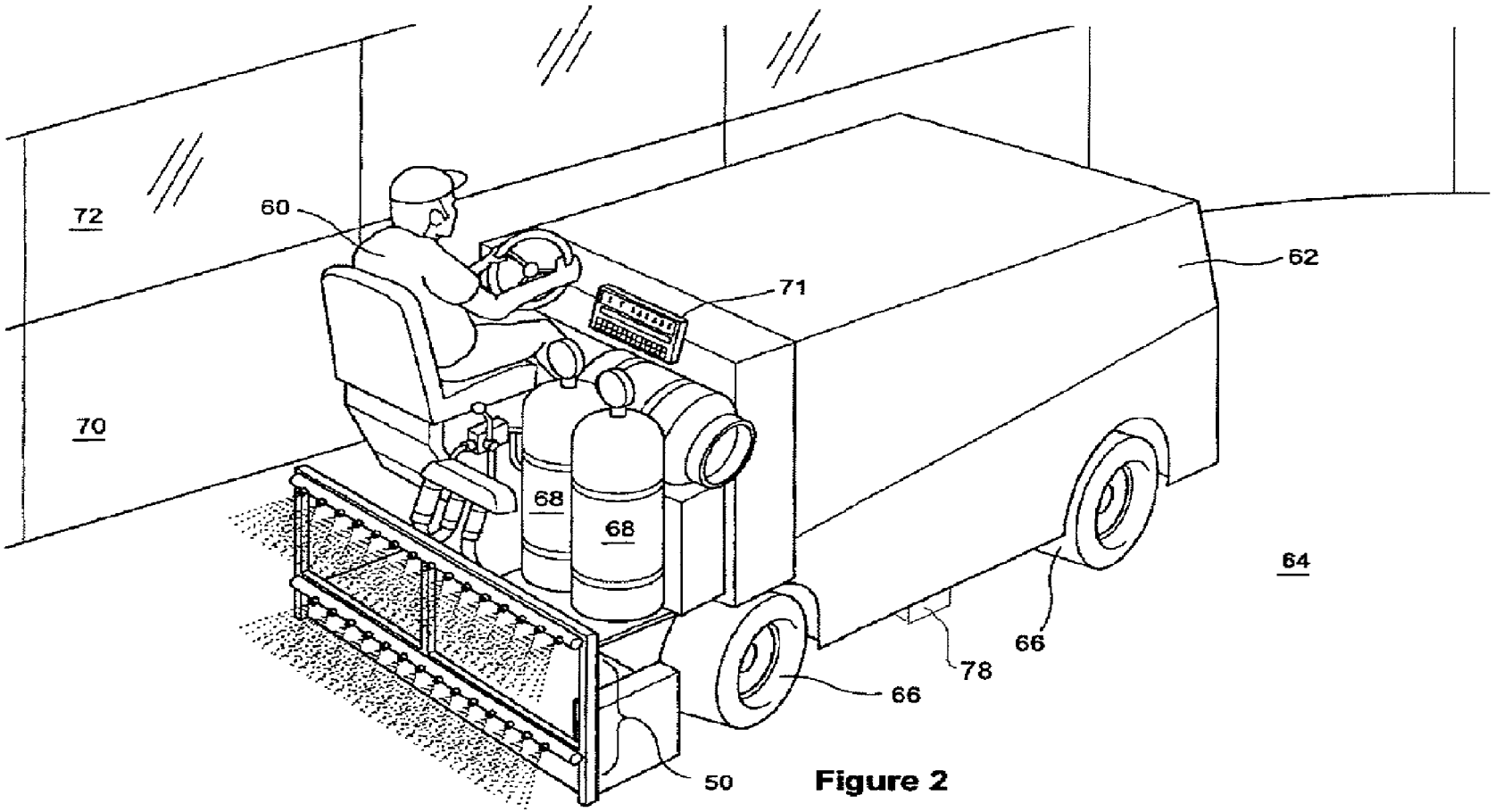
FIG. 2 is a view of an operator on a resurfacer modified according to the present invention.

FIG. 2 shows an operator 60 using a resurfacer 62 on an ice surface 64. The resurfacer 62 includes wheels 66, fuel tanks 68 and the spray bar assembly 50 of the present invention. The ice surface 64 may be surrounded by boards 70, with safety glass 72. Also shown is a driver interface panel 71 which can include indicators for pressure, speed, volume of spray, water temperature, air temperature, surface temperature, humidity or the like.

It will be appreciated that the present invention involves the application of water to a surface. How quickly the water being applied turns to ice will depend upon a number of factors, for example, the temperature of the cooled surface, and the temperature of the water and the amount of water being applied per unit time, which also may be considered to be the depth of water being applied at any given point on the surface. All of these factors will affect the operation of the present invention.

The present invention requires, for best results, that the water be degassed, before being applied, as such water has been found to form a harder, less void filled ice. Further the present invention requires, for best results that the water be applied in the form of a fine mist. This form of application also contributes to the formation of harder smoother ice.

One of the factors which affects the quality of the ice created is the droplet size produced by forcing the water under pressure through the nozzles. If the droplets are too large, then the ice surface can develop a rough pebbled texture which is not acceptable. On the other hand, if the droplets are too small, then the water tends to form a fog which remains airborne and tends to drift. Drifting will permit the water to settle onto the surface to be coated in an uncontrolled manner and can lead to an uneven application of the ice to the surface. Thus, the most preferred droplet size is one which is small enough to form a smooth unpebbled ice surface and which is large enough to be directed onto the ice in a controlled manner without excessive lateral drift.

A number of factors affect the size of the droplets. For example, the pressure to which the water is pressurized prior to expulsion out of the nozzle will affect the droplet size. Further, the type and size of nozzle that is used will also affect the droplet size. Of course, even from a nozzle operating at steady state conditions, a range of droplet sizes will be produced. Therefore, typically reference is made to the median diameter of the droplets produced by any given nozzle. Thus, in this specification the term droplet size refers to the median droplet size produced by any spray nozzle, and comprehends the full range of droplet sizes above and below the median droplet sizes that are inevitably produced by any nozzle.

Typically nozzles of the sort suitable for use in this invention are categorized in the following ranges:

Very fine: average droplet size of about 153 microns;

Fine: average droplet size of about 154 to 241 microns;

Medium: average droplet size of about 242 to 358 microns;

Coarse: average droplet size of about 359 to 451 microns;

Very coarse: average droplet size of about 452 to 740 microns; The most preferred droplet size for the present invention is in the micron size range and most preferable lies in the medium droplet size range. Of course, other sizes may also be used if they avoid the fogging and pebbling problems noted above.

Figure 3:
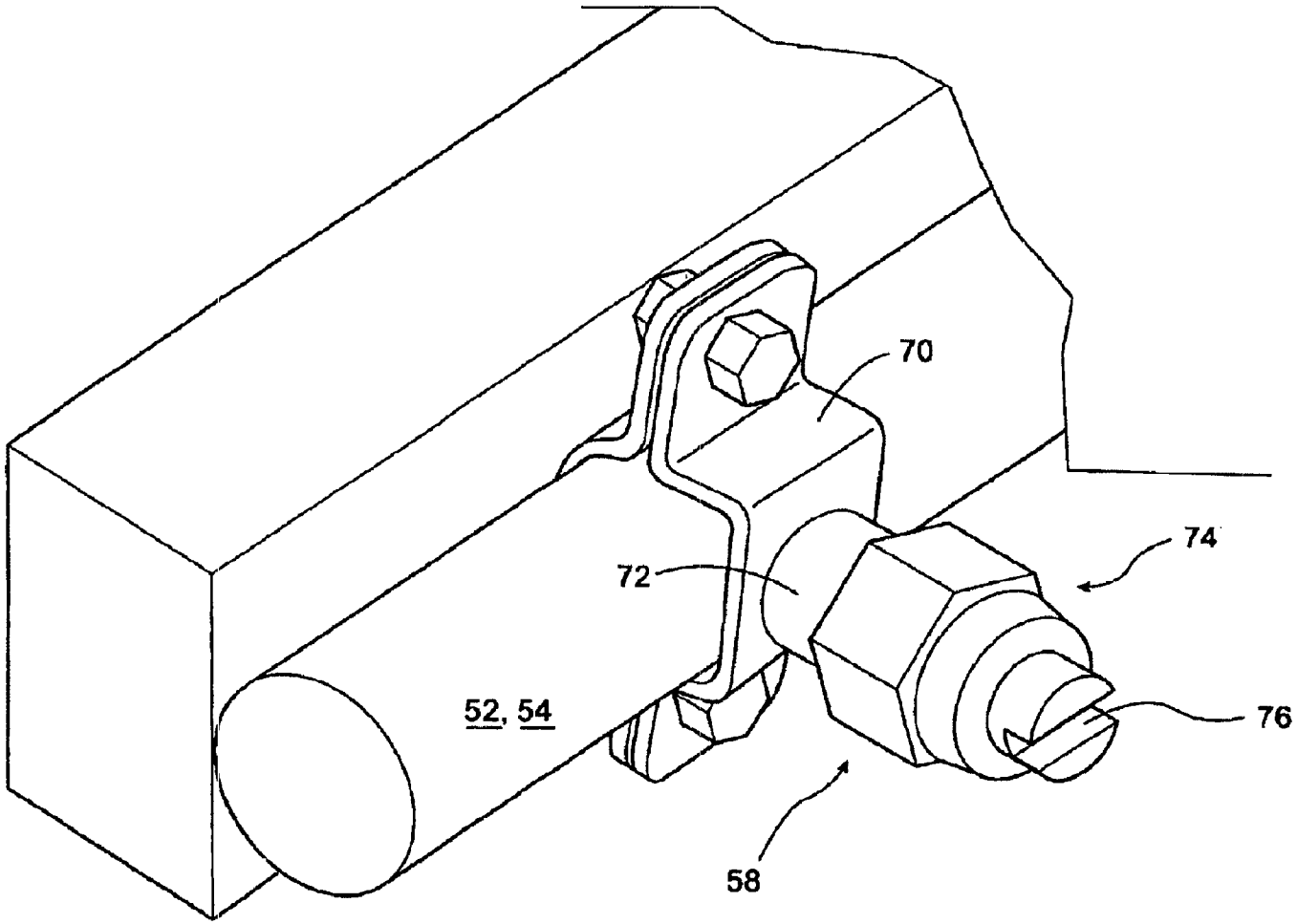
FIG. 3 is a detail of a spray nozzle according to the present invention.

FIG. 3 shows a nozzle 58 of the present invention. The nozzle 58 is mounted on a spray bar 52, 54 by a clamp 70, and has a conduit 72 in fluid communication with the spray bar 52, 54. The nozzle includes a valve member 74 which may be set to a predetermined pressure rating. Then, the spray is emitted from the flat tip 76.

Figure 4:
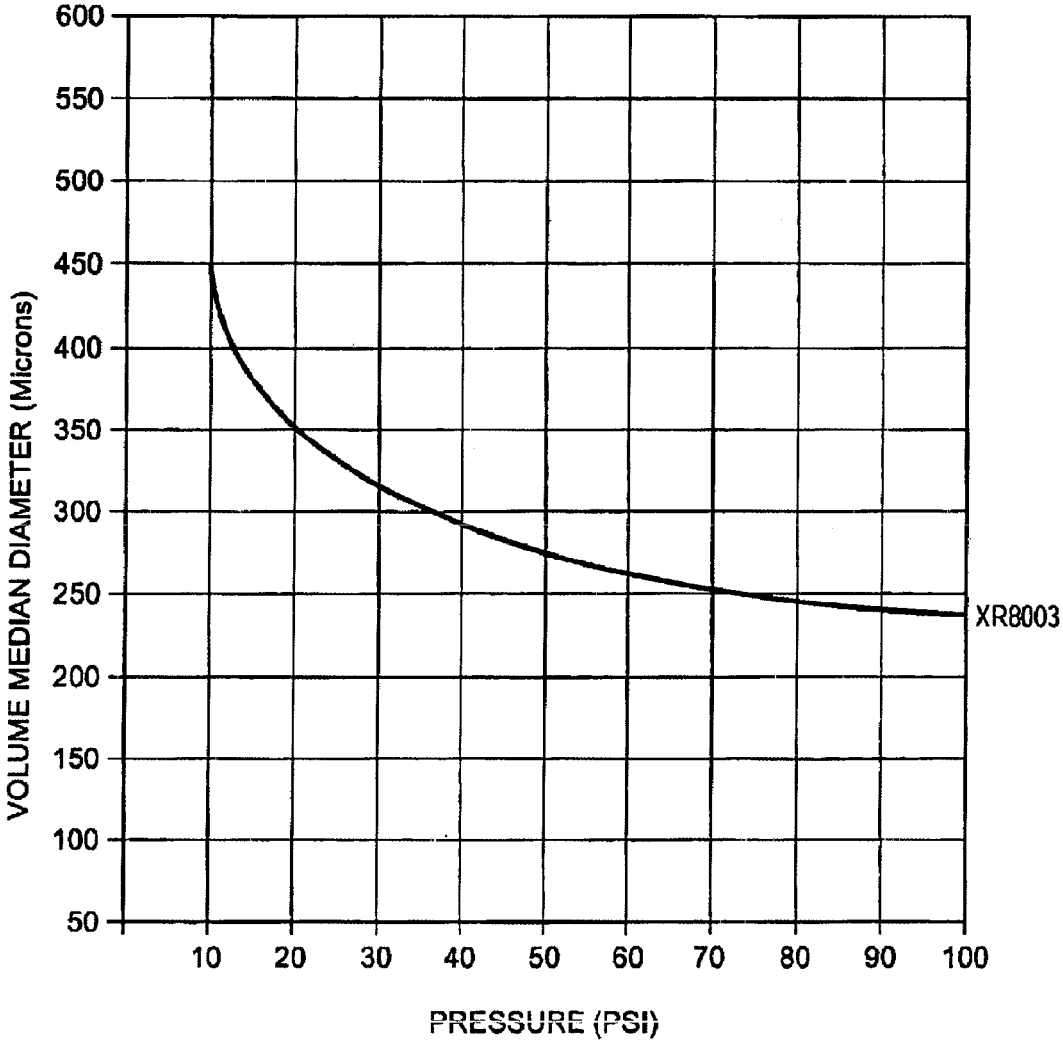
FIG. 4 is graph representing the change in droplet size for changes in line pressure and nozzle size.

FIG. 4 shows a typical pressure vs median diameter chart for spray nozzles. As can be noted, the higher the pressure, the smaller in size the median diameter of the droplets. Since the pressure can be varied, by varying pump speed for example, a variety of nozzles can be used, at different pressures, which will still deliver the desired small droplet size according to the present invention. Therefore it will be understood that a number of different nozzle sizes and types operating over a range of pressures are comprehended by the present invention, provided the same deliver the desired median droplet size.

Another factor to be accounted for according to the present invention is the rate at which the droplets are applied to the surface. The rate varies according to a number of factors, namely the number of nozzles and the rate at which the water is being expelled from the nozzles, and the speed of the machine which travels over the surface being coated. According to the present invention an optimal range of thicknesses to apply in a single pass is between about 0.04 mm and 0.40 mm, with a preferred thickness of about 0.14 mm. This thickness permits the ice layer to form quickly and to be well bonded to the ice below at typical indoor rink conditions. Good results have been achieved by setting down a thickness of ice of about 0.1597 mm in one pass.

Varying the pressure in the water lines will vary the rate at which the water is expelled from the nozzles. The higher the pressure the greater the rate of application of the water. On the other hand increasing the pressure has the effect for the preferred nozzles of reducing the size of the median droplet. Thus, while the pressure may be increased to increase the rate of spraying the pressure increase cannot be so much as to detrimentally affect the droplet size. Increasing the pressure may be desired for example if it is desired to increase the speed of the vehicle applying the treatment to the ice.

The preferred form of the spraying equipment is in two horizontal racks or bars of spraying nozzles. Most preferably a lower bar 54 is located about 10 to 14 inches off the ice surface and an upper bar 52 about 16 to 24 inches above the ice surface. The most preferred positions are at about 12 inches and about 18 inches. Other heights may also be used, provided that the same effects are achieved, but the heights noted above have been found to give good results.

The nozzles used in the upper bar are most preferably of the #6 type, while the lower nozzles are preferably of the #2 TeeJet type made by Spraying System Co. Thus the lower nozzles produce a smaller average droplet size, while the upper nozzles produce a larger average droplet size. Smaller droplets from the lower set of nozzles are preferred for a number of reasons. Firstly, since the lower nozzles are located close to the ice surface, even though the droplets are finer, there is less chance for the droplets to drift. Secondly, it is preferred to have the lower droplets begin to freeze either just before or even as the droplets from the upper rack reach the ice surface. The smaller droplets are more likely to freeze quickly, and using the preferred nozzles does tend to permit freezing of the lower spray before the upper spray is applied.

It will also be appreciated that the desire to lay down a layer thickness of about 0.14 mm, at the average speed of a resurfacer requires a certain volume of flow through the nozzles. For a given pressure suitable to produce the desired droplet sizes, the nozzles will each expel a predetermined amount of water. Thus to reach the desired application thickness requires a certain number of nozzles, which in turn has led to the use of the upper and lower nozzle bars. Good results have been achieved by using 11 nozzles on the top bar spaced about 5–10 inches preferred at 7 inches apart and 12 nozzles on the lower bar with about the same spacing.

Further, nozzles which have a specific angular spread to the spray path are preferred. For example, for the lower bar, 80 degree flat tip nozzles have been found to give good results. What is required is to provide a spread to the spray of droplets so that at the time the droplets make contact with the ice the spray is evenly distributed along a plane perpendicular to the path of the ice making machine. The top nozzles may also be of the 40 degree flat tip type. The evenness of the spray across the spray path can be tested by spraying a water impervious corrugated surface, and measuring the water flowing off each corrugations. Then the direction of spray of the nozzles can be adjusted until the corrugations are each receiving about the same amount of water.

It is further desired to ensure that at the edge of the spray path a sharp limit is defined so that the operator can lay down successive swaths of new ice without overlap. Overlap at the edges of each swath or pass will lead to uneven ice and deter from the playability of the surface. Thus it is preferred to modify the end nozzles of each nozzle bar slightly so as to direct the spray from these nozzles in a way that forms well-defined spray edge to the spray path. For example, the nozzles themselves can be of a predetermined spray angle, or the nozzles can be turned so as to cause the outer spray path angle to lie generally parallel to the path of the vehicle.

It will be appreciated that the operator must make numerous passes across the ice surface to either coat or resurface the same. In the past the width of the ice forming path was defined by the width of cloth dragged over the surface. According to the present invention the width of the pass will be defined by the spray pattern produced by the sprayer nozzles. For convenience, this width can be made the same as the current cloth-based systems. However, it will be appreciated by those skilled in the art that any width of path can be chosen, within certain limits. For example, it is necessary for the machine to fit through the standard opening in the boards surrounding the ice surface. However, because the present invention uses a spray frame, it can be made with hinging components which permit it to fold small enough to fit through the boards, and yet be unfolded to be quite a bit larger. In all cases however, the pressure will have to be maintained to permit the spray to be evenly distributed across the swath of the ice formed in the spray path.

It has been found that the application of ice according to the present invention creates a noticeable change in appearance for the ice surface. This change in appearance provides the operator with an easily identifiable edge so as to be able to lay down successive swaths one next to the other without overlap. It has been found convenient to provide a spray path which is approximately the same size as the prior drag paths for ease of operator use. However, wider spray paths are also comprehended and might be useful, for example if ice building was to be more quickly accomplished.

EXAMPLE

A test slab was made to test the formation of ice according to the present invention. The test slab consisted of a cooled surface of 2.5 square feet in size. The conditions during the test included the following: ambient air temperature 54° F., water temperature 150° F., test slab temperature 17° F., ice thickness ¾" and water source municipal water.

In the first test, water was poured onto the test slab at ⅓ liter at a time. The oxygen content was measured at 10.5 parts per million before the water was applied to the slab. Once the ice was formed, it was tested for hardness and a Leeb reading of 202 was obtained. This application method is analogous to a conventional water flood of the prior art.

In a second test, municipal water was sprayed onto the test slab using a top spray bar (3 T-Jet 4006 Nozzles @ 18" above slab) and a bottom spray bar (3 T-Jet 8002 Nozzles @ 10" above slab). Oxygen content before spraying was measured at 10.5 and a Leeb hardness reading of 235 was obtained.

In the third test, water was sprayed onto the test slab using a top spray bar (3 T-Jet 4006 Nozzles @ 18" above slab) and a bottom spray bar (3 T-Jet 8002 Nozzles @ 10" above slab). The water was degassed before being applied and oxygen content was measured at 2.5 parts per million. In the hardened ice, a Leeb reading of 246 was measured. A Th-series portable digital hardness tester was used to obtain the Leeb readings in all cases. Also, the slabs were tested after the same cooling time to ensure comparability of results.

In summary, a range of ice hardness of between about 230 to 260 is preferred, based on the Leeb hardness scale, and an oxygen dissolved gas content of less than about 5 parts per million and most preferably about 3 or less parts per million is most preferred. Note that spraying provides significant improvements in hardness, but that spraying and degassing provides even better results.

One preferred form of the present invention is a kit of components to convert a standard resurfacer into a spray resurfacer as taught by this invention. Such a kit provides the components needed to establish a spray system on an existing resurfacer.

The first element of the kit is a hydraulically driven pump 12. A centrifugal pump made by HyPro has been found to provide suitable results. Modifications to the hydraulic system require a new cam, and a new diverter 15 as described above. The next element is the pressure line 24 and manifolds 36, which can be made from any suitable materials having an appropriate pressure rating. The next element is the sprayer 48, which can be made according to the specifications provided above. The sprayer most preferably includes #6 and #2 TeeJet nozzles made by Spraying System Co. The nozzle material can be made from any suitable material such as stainless steel, hardened stainless steel, polymer, brass or ceramic, but stainless steel provides good results.

As noted below, most prefer ably the manifold will include sensors whose output can be linked to a microprocessor according to the present invention. Any suitable form of microprocessor can be used such as a PLC, microcomputer or the like. In a preferred form of the invention the spraying process is automated, and a driver display or interface 71 is provided to permit the driver to monitor the application of new ice. Another feature of the kit according to the present invention is to provide a speedometer, air temperature, water temperature, surface temperature, humidity sensor, as an input into the microprocessor.

If needed, a heater 18 can also be provided for the water tank 16, or, the water tank 16 can be insulated and the water heated elsewhere. Heating the water is preferred to ensure that the water is at the optimum temperature just prior to spraying. However, even if the tank is uninsulated, if enough hot water is provided before a resurfacing run, it may still be hot enough in even an uninsulated tank to yield good results.

The present invention comprehends using a microproccesor with electronic control for integrating the operation of the spray system with the speed of the vehicle. In this cas the speed of the vehicle is monitored by a vehicle speed sensor 75 and an electrical output signal is provided which is then correlated to the speed of the vehicle. The nozzles are then calibrated by determining the change in the rate of application or volume of spray to the change in pressure. The calibration step is done with due consideration to limiting operating pressures to those within the range of droplet sizes which form good ice. Once the calibration between the ice application rate and the pressure is attained, then the microprocessor can be used to automatically vary the volume to achieve a spray rate suitable for providing a uniform ice thickness regardless of the speed of the vehicle. In this way the operator can drive as fast or as slow as they are comfortable with and at the same time not need to worry that the thickness of new ice is going to vary.

Another aspect of the present invention therefore is the use of a microprocessor based water delivery system which can correlate the amount of water being applied to form the ice to a speed of the ice applying device so that the ice thickness can be made constant, even though the device may speed up or slow down. In the most preferred form of the invention this is accomplished by means of regulating a hydraulic pump, in accordance with a speed of the device. However, the present invention also comprehends using automatic valves, or other means to control the flow of water to permit the ice surface to be applied with a uniform thickness even if the vehicle applying the ice speeds up or slows down for corners or the like. Thus, the present invention broadly comprehends a method of forming ice wherein an even amount of ice is applied regardless of an ice applicating devices speed.

A further consequence of the use of a volume control as part of the application process, is that the thickness of any individual application can be set or predetermined prior to applying the new surface. Thus, the thickness of the resurfacing application can be varied according to local conditions, such as surface temperature, ambient air temperature, humidity, or the like. The microprocessor of the present invention preferably records the parameters of each application, whether resurfacing or creating a fresh sheet, which can then be studied and reviewed against sheet performance. In this way optimal results can be obtained notwithstanding changes in conditions from rink to rink or, from season to season at a specific rink.

As well, the microprocessor can record the total volume of water put down. In the past, without the ability to monitor this amount, operators could have put down too much or too little water, both of which affect ice quality. Thus, the present invention comprehends providing a report which permits the rink maintenance to be monitored and improved.

There are two ways of changing the volume of spray by regulating the pressure in the spray system. The preferred way is to use a pressure regulating valve that is electronically controllable. With such a valve, the microprocessor can control the pressure by opening or closing the valve according to the speed of the resurfacer. Alternatively, the microprocessor can control the pump speed according to vehicle speed to thereby vary the pressure to suit the variations in speed. Other methods of controlling the rate of spraying are also comprehended, such as a manual valve operated by the driver.

The present invention is believed to have two principle benefits over conventional ice formation techniques. Firstly, by heating the water, favourable conditions are established to force any dissolved gasses out of solution. The hotter, the better since the hotter the water is the lower the solubility of such gasses in water. In the pressure lines, the dissolved gasses cannot escape. However, by shearing the water and forcing the water through the nozzles, the water is separated into many tiny hot water droplets. The formation of such droplets maximizes the surface area for that volume of water, thus enhancing the opportunity for the dissolved gasses to be forced out of the water. This may be thought of as a flash de-gassing of the water. Further, and also importantly, the freezing of small droplets has an effect on the mechanical nature of the ice. During the freezing step, impurities, which are always present in minute amounts, will tend to be expressed on the surfaces of any crystal formed. It is believed that the present invention produces ice formed of very small crystals which are more closely packed, and thus form a denser smoother and stronger ice that is made by conventional flooding techniques.

Some of the features and benefits of the present invention can now be understood. For example, although the spray technique off the present invention freezes quickly, it is still quite easy to see the edges of the spray path. This is desirable so the operator can avoid overlap in successive passes in the application of the ice. Further the ice freezes to a clear and hard sheet, with very little voids as compared to the prior art. This is evident by reason of the highly reflective nature of the ice so formed, in which overhead lights are reflected clearly. The ice is harder and so rather than requiring about 1½ to 1¾ inch of ice thickness, a suitable ice surface can be formed which is only ¾ to 1 inch thick. This thinner ice sheet is much easier to keep cool and reduces the power consumption required for the necessary refrigeration. Further, the nozzles can be turned on or off, resulting in a more precise application of water to the ice surface. In the prior art, even if the water was turned off, the wet cloth continues to deposit water. Thus, portions may be double coated (i.e. getting on and off the ice), or more heavily flooded (for example when the resurfacer slows down to navigate the corners) which is now eliminated. Thus, the finished ice surface is even, reducing the ice maintenance. Another benefit of the present invention is that the thinner layer reduces the heat load which is imposed by the puddles of the prior art.

As will be understood from the foregoing, the harder stronger ice of the present invention can be made thinner and yet still produce safe reliable results for even vigorous professional hockey play. The present ice reduces the heat load of maintaining the ice both by its physical properties (it is easier to cool having fewer air voids) and its smaller size. Maintaining the desired smaller thickness therefore is an important aspect of being able to take advantage of the lower heat load possible. Thus, the present invention also comprehends a form of ice thickness control for the ice maker.

In one aspect, the ice thickness control is made of two components. The first, is an ice thickness sensor *78* mounted into the onboard sensor system of the ice maker. Such a sensor can be in the form of any type of proximity sensor such as one based on electric or magnetic fields or the like. Most preferably, the sensor will permit the operator to read the thickness of the ice as the ice making machine passes over the ice during resurfacing. In some cases, it may be necessary to install sensor devices under the ice to permit the thickness sensor to operate. Other sensors may be able to determine the ice thickness without under the ice sensor devices, but both are comprehended by the present invention.

Once the ice thickness is known, then the present invention comprehends that the information will be fed into an ice maintenance program located in an onboard microprocessor. The onboard microprocessor then will compare the ice thickness measured to the optimum ice thickness desired and will raise or lower the ice cutting blade accordingly. In this manner, the ice thickness can be maintained and problems of local ice build-up, common in the prior art, are avoided. While any number of mechanical and hydraulic actuators may be used, a switch box control unit has been found satisfactory. In this case, the blade ice cutting depth is automatically adjusted to the predetermined setting by an electric motor attached to a reduction box.

It will be appreciated by those skilled in the art that various embodiments of the invention can be made without departing from the broad scope of the attached claims. Some of these variations have been discussed above and others will be apparent to those skilled in the art. For example, while specific pressures and temperatures have been disclosed, other temperatures and pressures will also work, depending upon the nozzle sizes and vehicle speed. What is believed important is to provide a spray of fine droplets of de-gassed water, which on the one hand is a controllable spray to permit the spray to be directed towards the surface to be coated in an controlled manner and yet on the other hand is fine enough to freeze as a clear unpebbled sheet with high skatability.

The embodiments of the invention in which an exclusive property or privilege is claimed are defined as follows:

1. A mobile ice maker for creating [a] *an exposed* layer of ice on *top of* a *preexisting* cooled surface, the mobile ice maker comprising:

a source of water;

a pump to pressurize the water;

a pressure line to maintain pressure in the water between the pump and a sprayer;

a means to regulate said hydraulic pump according to a speed of said mobile ice maker over said cooled surface and nozzles on said sprayer, said nozzles being sized and shaped to cause said water forced through said nozzles by said pressure to form a [line] *fine* droplet spray directed at said cooled surface, said nozzles being positioned to produce spray patterns which distribute said droplets evenly on said cooled surface to form a continual layer, wherein said droplets are sized to substantially freeze on contact with the cooled surface *to form a planar sheet of exposed ice having a Leeb hardness reading of greater than or equal to 230*.

2. The mobile ice maker for creating a layer of ice on a cooled surface as claimed in claim 1 wherein said water is de-gassed.

3. The mobile ice maker for creating a layer of ice on a cooled surface as claimed in claim 2 wherein said ice maker includes a heater to de-gas the water by heating the water.

4. The mobile ice maker for creating a layer of ice on a cooled surface as claimed in claim 3 wherein said ice maker includes an insulated tank for storing heated water.

5. The mobile ice maker for creating a layer of ice on a cooled surface as claimed in claim 3 wherein said water is heated to a temperature of between 140° F. and 160° F. prior to being applied to said surface.

6. The mobile ice maker for creating a layer of ice on a cooled surface as claimed in claim 1 wherein said pump pressurizes said water to at least 10 psi.

7. The mobile ice maker for creating a layer of ice on a cooled surface as claimed in claim 1 wherein said pump pressurizes said water to a pressure in a range of about 10 to 60 psi.

8. The mobile ice maker for creating a layer of ice on a cooled surface as claimed in claim 1 wherein said pump pressurizes said water to a pressure in a range of about 30 psi.

9. The mobile ice maker for creating a layer of ice on a cooled surface as claimed in claim 1 wherein said average droplet size produced by said nozzles is between 154 and 740 microns.

10. The mobile ice maker for creating a layer of ice on a cooled surface as claimed in claim 1 wherein said average droplet size produced by said nozzles is between about 240 and 360 microns.

11. The mobile ice maker for creating a layer of ice on a cooled surface as claimed in claim 1 wherein said ice maker is mounted on a self-propelled vehicle and said sprayer defines a spray path on said surface which is at least as wide as said self-propelled vehicle.

12. The mobile ice maker for creating a layer of ice on a cooled surface as claimed in claim 1 wherein said ice maker, wherein said means for regulating said hydraulic pump further includes at least a water pressure sensor and a vehicle speed sensor.

13. The mobile ice maker for creating a layer of ice on a cooled surface as claimed in claim 12 wherein said speed sensor produces an output signal and said ice maker further includes a microprocessor for receiving said output and for controlling a spray volume so as to produce the same ice thickness at different speeds.

14. The mobile ice maker for creating a layer of ice on a cooled surface as claimed in claim 1 wherein said sprayer is comprised of at least upper spray nozzles and lower spray nozzles.

15. The mobile ice maker for creating a layer of ice on a cooled surface as claimed in claim 14 wherein the lower spray nozzles produce droplets of an average droplet size which is smaller than those produced by the upper nozzles.

16. The mobile ice maker for creating a layer of ice on a cooled surface as claimed in claim 15 wherein said upper nozzles are #6 tips and the lower spray nozzles are #2 tips.

17. The mobile ice maker for creating a layer of ice on a cooled surface as claimed in claim 15 wherein said upper spray nozzles are about 18 inches above the surface to be coated and the lower spray nozzles are about 12 inches above the surface to be heated.

18. The mobile ice maker for creating a layer of ice on a cooled surface as claimed in claim 15 wherein said sprayer is wider than said vehicle and includes at least one pivot to permit the sprayer to be pivoted so as to pass through a narrower opening.

19. The mobile ice maker for creating a layer of ice on a cooled surface as claimed in claim 1 wherein said layer of ice is between 0.04 mm and 0.40 mm (1/640 and 1/64 of an inch) thick.

20. A mobile ice maker for creating [a] *an exposed* layer of ice on *top of* a *preexisting* cooled surface for ice skating, the mobile ice maker comprising:

a source of water for making ice a pump to pressurize the water; a means to regulate said pump according to a speed of said mobile ice maker over said cooled surface and;

a sprayer to spread said water said cooled surface in the form of a fine mist, *to form a planar sheet of exposed ice having a Leeb hardness reading of greater than or equal to 230*; and an instrumentation system for correlating the rate of application of water to a speed of said ice maker *and* to permit said ice to be formed in a layer of uniform thickness.

21. A mobile ice maker as claimed in claim 20 wherein said ice maker further includes an ice thickness [detector] *sensor operatively connected to said instrumentation system, wherein said ice thickness sensor is adapted and positioned on said mobile ice maker to detect a thickness of ice formed on said cooled surface and to transmit said thickness to said instrumentation system*.

22. A mobile ice maker as claimed in claim 20 wherein said ice maker further includes a height adjustable ice cutting blade whereby a predetermined ice thickness can be obtained.

23. A mobile ice maker as claimed in claim 20 further including a microprocessor to receive inputs from one or more sensors for assisting to spread said water.

24. A mobile ice maker as claimed in claim 23 wherein said microprocessor produces a report on ice quality and thickness.

25. A mobile ice maker for creating [a] *an exposed* layer of ice on *top of* a *preexisting* cooled surface, the *mobile* ice maker being mounted on a self-propelled vehicle, said ice maker comprising:

a source of de-gassed water;

a pump to pressurize the de-gassed water;

a sprayer hydraulically connected to the pump and having nozzles sized and shaped to convert said pressurized de-gassed water into a fine droplet spray directed at said cooled surface, said droplets being sized to substantially freeze on contact with said cooled surface *to form a planar sheet of exposed ice having a Leeb hardness reading of greater than or equal to 230*;

a water pressure sensor;

a vehicle speed sensor, to produce an output signal corresponding to a speed of said vehicle; and a microprocessor for receiving said output signal [end] *and* for controlling a spray volume so as to produce the same ice thickness at different vehicle speeds.

26. A mobile ice maker for creating [a] *an exposed* layer of ice on *top of* a *preexisting* cooled surface, the mobile ice maker comprising:

a source of de-gassed water;

a pump to pressurize the de-gassed water;

a pressure line to maintain pressure in the water between the pump and a sprayer;

a means to regulate said hydraulic pump according to a speed of said mobile ice maker over said cooled surface and nozzles on said sprayer, said nozzles being sized and shaped to cause said water forced through said nozzles by said pressure to form a fine droplet spray directed at said cooled surface, said sprayer being comprised of at least upper spray nozzles and lower spray nozzles, wherein said droplets are sized to substantially freeze on contact with the cooled surface *to form a planar sheet of exposed ice having a Leeb hardness reading of greater than or equal to 230*.

27. The mobile ice maker for creating a layer of ice on a cooled surface as claimed in claim 26 wherein the lower spray nozzles produce droplets of an average droplet size which is smaller thin those produced by the upper nozzles.

28. The mobile ice maker for creating a layer of ice on a cooled surface as claimed in claim 27 wherein said upper nozzles are #6 tips and the lower spray nozzles are #2 tips.

29. The mobile ice maker for creating a layer of ice on a cooled surface as claimed in claim 27 wherein said upper spray nozzles are about 18 inches above the surface to be coated and the lower spray nozzles are about 12 inches above the surface to be treated.

30. The mobile ice maker for creating a layer of ice on a cooled surface as claimed in claim 27 wherein said sprayer is wider than said vehicle and includes at least one pivot to permit the sprayer to be pivoted so as to pass through a narrower opening.

31. A mobile ice maker for creating [a] *an exposed* layer of ice on *top of* a *preexisting* cooled surface, the *mobile* ice maker comprising:

a source of de-gassed water;

a pump to pressurize the de-gassed water;

a pressure line to maintain pressure in the water between the pump end a sprayer;

a means to regulate said hydraulic pump according to a speed of said mobile ice maker over said cooled surface and nozzles on said sprayer, said nozzles being sized and shaped to cause said water forced through said nozzles by said pressure to form a fine droplet spray directed at said cooled surface, said nozzles being positioned to produce spray patters which distribute said droplets evenly on said cooled surface to form a continual layer;

wherein said droplets are sized to substantially freeze on contact with the cooled surface *to form a planar sheet of exposed ice having a Leeb hardness reading of greater than or equal to 230*, and wherein said nozzles are arranged in a row and said nozzles at either end of said row are modified to [farm] *form* a well-defined spray edge on said cooled surface.

*32. A mobile ice maker for creating an exposed layer of ice on top of a preexisting cooled surface, the mobile ice maker comprising:*

*a source of water;*

*a pump to pressurize the water;*

*a pressure line to maintain pressure in the water between the pump and a sprayer;*

*nozzles on said sprayer, said nozzles being sized and shaped to cause said water forced through said nozzles by said pressure to form a fine droplet spray directed at said cooled surface, said nozzles being positioned to produce spray patterns which distribute said droplets evenly on said cooled surface to form a continual layer;*

*wherein said ice maker is mounted on a self-propelled vehicle, further including at least a water pressure sensor and a vehicle speed sensor, and*

*further wherein said droplets are sized to substantially freeze on contact with the cooled surface to form a planar sheet of exposed ice having a Leeb hardness reading of greater than or equal to 230.*

*33. A mobile ice maker for creating an exposed layer of ice on top of a preexisting cooled surface, the mobile ice maker comprising:*

*a source of water;*

*a pump to pressurize the water;*

*a pressure line to maintain pressure in the water between the pump and a sprayer; and*

*nozzles on said sprayer, said nozzles being sized and shaped to cause said water forced through said nozzles by said pressure to form a fine droplet spray directed at said cooled surface, said nozzles being positioned to produce spray patterns which distribute said droplets evenly on said cooled surface to form a continual layer;*

*wherein said droplets are sized to substantially freeze on contact with the cooled surface to form a planar sheet of exposed ice having a Leeb hardness reading of greater than or equal to 230;*

*further wherein said sprayer is comprised of at least upper spray nozzles and lower spray nozzles directed at said cooled surface, and*

*further wherein the lower spray nozzles produce droplets of an average droplet size which is smaller than those produced by the upper nozzles.*

*34. A mobile ice maker for creating an exposed layer of ice on top of a preexisting cooled surface for ice skating, the mobile ice maker comprising:*

*a source of water for making ice;*

*a sprayer to spread said water on said cooled surface in the form of a fine mist to form a planar sheet of exposed ice having a Leeb hardness reading of greater than or equal to 230;*

*an instrumentation system for correlating the rate of application of water to a speed of said ice maker to permit said ice to be formed in a layer of uniform thickness, and*

*an ice thickness sensor operatively connected to said instrumentation system,*

*wherein said ice thickness sensor is adapted and positioned on said mobile ice maker to detect a thickness of ice formed on said cooled surface and to transmit said thickness to said instrumentation system.*

*35. A mobile ice maker for creating an exposed layer of ice on top of a preexisting cooled surface, the mobile ice maker comprising:*

*a source of de-gassed water;*

*a pump to pressurize the de-gassed water;*

*a pressure line to maintain pressure in the water between the pump and a sprayer;*

*nozzles on said sprayer, said nozzles being sized and shaped to cause said water forced through said nozzles by said pressure to form a fine droplet spray directed at said cooled surface, said sprayer being comprised of at least upper spray nozzles and lower spray nozzles, said at least upper spray nozzles and lower spray nozzles being directed at said cooled surface;*

*wherein said droplets are sized to substantially freeze on contact with the cooled surface to form a planar sheet of exposed ice having a Leeb hardness reading of greater than or equal to 230, and*

*wherein the lower spray nozzles produce droplets of an average droplet size which is smaller than those produced by the upper nozzles.*

* * * * *